: US 11,347,772 B2
(45) Date of Patent: May 31, 2022

(12) United States Patent
Chatrain et al.

(54) SYNCHRONIZED DATA MANAGEMENT SYSTEM AND METHOD (71) Applicant: AMADEUS S.A.S., Biot (FR)

(72) Inventors: Baptiste Chatrain, Madrid (ES); Pranav Pandey, Nice (FR); Nagesha Yellur Jayarama, Bengaluru (IN); Valentin Weber, Sydney (AU); Michael Mangili-Vincent, Sydney (AU)

(73) Assignee: AMADEUS S.A.S., Biot (FR)

( * ) Notice: Subject to any disclaimer, the term of this patent is extended or adjusted under 35 U.S.C. 154(b) by 127 days.

(21) Appl. No.: 16/715,566

(22) Filed: Dec. 16, 2019

(65) Prior Publication Data
US 2020/0201884 A1 Jun. 25, 2020

(30) Foreign Application Priority Data
Dec. 21, 2018 (FR) ...................................... 1874006

(51) Int. Cl.
*G06F 16/27* (2019.01)
*G06F 16/23* (2019.01)

(52) U.S. Cl.
CPC ........ *G06F 16/273* (2019.01); *G06F 16/2365* (2019.01)

(58) Field of Classification Search
CPC ........................... G06F 16/273; G06F 16/2365
See application file for complete search history.

(56) References Cited

U.S. PATENT DOCUMENTS

| 7,730,034 | B1* | 6/2010 | Deflaux | G06F 16/25 |
| | | | | 707/654 |
| 10,216,631 | B1* | 2/2019 | McConnell | G06F 16/24552 |
| 2002/0156792 | A1* | 10/2002 | Gombocz | G06F 16/20 |
| 2008/0170701 | A1* | 7/2008 | Matsuo | H04L 63/0442 |
| | | | | 380/281 |

(Continued)

OTHER PUBLICATIONS

Anonymous: "Git—Contributing to a Project", Oct. 24, 2014. Retrieved from the Internet: URL: https://git-scm.com/book/en/v2/GitHub-Contributing-to-a-Project.
(Continued)

*Primary Examiner* — James Trujillo
*Assistant Examiner* — Fariborz Khoshnoodi
(74) *Attorney, Agent, or Firm* — Perry + Currier (57) ABSTRACT

A synchronized data management system, connected to at least one user device through a network, includes: a server to receive requests from the user device and a common storage database comprising a master storage unit configured to store data; and an auxiliary storage unit configured to store updated data. The synchronized data management system is configured to: transmit a subset of data stored in the master storage unit to a given user device in response to an update request received by the server from the user device; store an update made to the subset of data and received from the user device in the auxiliary storage unit; and store the update made to the subset of data to the master storage unit in response to one or more validation requests received from a set of selected user devices, the set of selected user devices comprising at least one user device.

10 Claims, 8 Drawing Sheets

(56) References Cited

U.S. PATENT DOCUMENTS

| | | | | |
|---|---|---|---|---|
| 2012/0197844 | A1* | 8/2012 | Wang | G06F 11/2097 |
| | | | | 707/646 |
| 2013/0191814 | A1* | 7/2013 | Fujii | G06F 11/3684 |
| | | | | 717/124 |
| 2014/0040186 | A1* | 2/2014 | Okamura | G07G 1/0063 |
| | | | | 707/609 |
| 2015/0188748 | A1* | 7/2015 | Watariuchi | H04L 41/082 |
| | | | | 709/220 |
| 2017/0034236 | A1* | 2/2017 | Bank | G06F 16/48 |
| 2017/0262493 | A1* | 9/2017 | Bhojwani | G06F 16/2455 |
| 2018/0068030 | A1* | 3/2018 | Maeda | G06F 16/00 |
| 2018/0234496 | A1* | 8/2018 | Ratias | A63F 13/60 |

OTHER PUBLICATIONS

Anonymous: GitHub—yangsu/pull-request-tutorial: A Visual Guide to Pull Requests, Jul. 20, 2016. Retrieved from the Internet: URL: https://github.com/yangsu/pull-request-tutorial.

* cited by examiner

SYNCHRONIZED DATA MANAGEMENT SYSTEM AND METHOD

CROSS-REFERENCE TO RELATED APPLICATION

This application claims priority from French patent application no. 1874006, filed Dec. 21, 2018, the contents of which is incorporated herein by reference.

TECHNICAL FIELD

The invention generally relates to computers and computer software and, in particular, to systems, methods, and computer program products for centrally managing data.

BACKGROUND

Computerized systems and networks are widely used to improve productivity and optimize resources in environments where important data flows are to be exchanged between multiple user devices. However, in some control systems, such as control tower systems for example, a particular level of safety may be required to secure the data flows exchanged between several devices (server, database, user device) while ensuring that particular data flows are timely and securely received by the devices.

In such environments, it is known to dedicate each device to a particular function, while data flows are decentralized and exchanged directly from one device to another.

For example, in a data scheduling system (such as a control tower system) comprising one or more scheduling devices separately managing various data that impact scheduling, an operator managing one of the devices may contact the operator managing another device through a private network to request data updates. If an agreement is reached between the two operators, the update may be executed. These two operators can further need to contact separately one or more other schedule operators using a bidirectional communication (e.g. phone exchange) to exchange data that may impact the data managed by such schedule operators. Accordingly, data can only be exchange between each pair of scheduling devices, in a decentralized way, to optimize the security of the exchange and/or a safety level.

Such decentralized approach consumes much computerized resources and may introduce important time latency, which is undesirable in a real time data environment.

Improved systems, methods, and computer program products for centrally managing data accessible from multiple external devices are accordingly needed.

SUMMARY

To address these and other problems, there is provided a synchronized data management system for managing data, the system being connected to at least one user device being connected to the synchronized data management system through a network. Advantageously, the system comprises a server configured to receive requests from the at least one user device and a common storage database comprising a master storage unit configured to store data. The synchronized data management system may further comprise an auxiliary storage unit configured to store updated data, the synchronized data management system being configured to transmit a subset of data stored in the master storage unit to a given user device in response to an update request received by the server from the user device. The synchronized data management system is configured to store an update made to the subset of data and received from the user device in the auxiliary storage unit, the synchronized data management system being further configured to store the update made to the subset of data to the master storage unit in response to one or more validation requests received from a set of selected user devices, the set of selected user devices comprising at least one user device.

In one embodiment, the synchronized data management system may be configured to send a message including an update stored in the auxiliary storage unit to each user device of the set of selected user devices.

The synchronized data management system may comprise an encoder unit configured to encode the update using at least one encoding mechanism and send a message including the encoded update to each user device of the set of selected user devices.

In one embodiment, the data encoder unit may be configured to encode the update in a data format handled by the user device of the set of selected user devices.

In one embodiment, the auxiliary storage unit may be located in the common storage unit.

Advantageously, the update made to the subset of data may be associated with a unique identifier, the unique identifier being stored in the auxiliary storage unit.

The system may be further configured to send the subset of data of the master storage unit associated with the update to each user device of the set of selected user devices.

The system may be configured to receive a modified version of the update made to the subset of data from a user device of the set of selected user devices and store the modified version of the update to the auxiliary storage unit.

In one embodiment, the server may comprise a conflict resolution unit configured to detect and resolve a data conflict between the update made to the subset of data in the auxiliary storage unit and the master data of the master storage unit, the conflict resolution unit being further configured to merge the update made to the subset of data in the auxiliary storage unit with the master data of the master storage unit in response to conflict resolution, prior to integration of the merged data in the master storage unit.

There is further provided a synchronized data management method for managing data in a computerized system connected to at least one user device through a network, wherein the method comprises transmitting a subset of data stored in a master storage unit of the system to a given user device in response to an update request received from the user device, the method further comprising storing an update made to the subset of data and received from the user device in an auxiliary storage unit, the update made to the subset of data being stored to the master storage unit in response to one or more validation requests received from a selected set of user devices, the set of selected user devices comprising at least one user device.

BRIEF DESCRIPTIONS OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 2 represents an exemplary operational environment of the synchronized data management system, according to an exemplary application of the invention to a Control Tower System.

DETAILED DESCRIPTION

Figure 1:
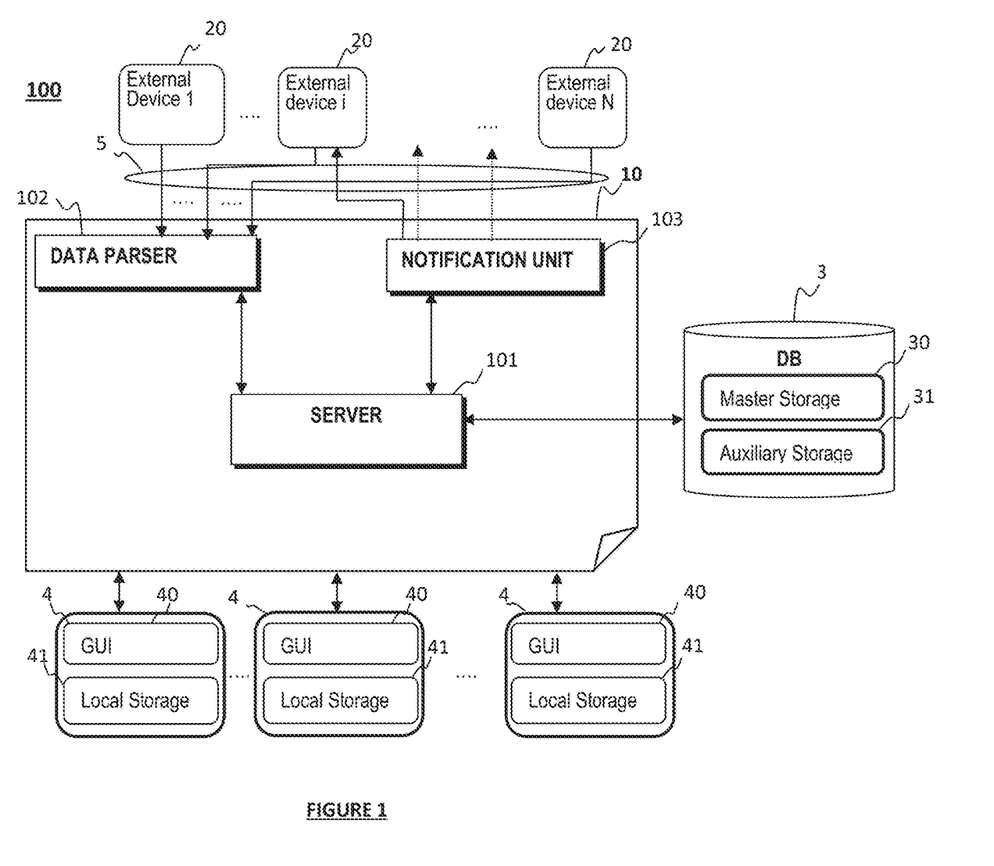
FIG. 1 is a diagrammatic view of an exemplary operating environment including a synchronize data management system in communication via a network with multiple external devices.

Referring to FIG. 1, there is shown an exemplary operational environment 100 of a Synchronized Data Management System 10 (also referred to as 'SDMS' in some figures), in accordance with some embodiments of the invention.

The operational environment 100 comprises a synchronized data management system 10 which is connected to one or more user devices 4 through a network 5.

In some embodiments, the synchronized data management system 10 may be optionally connected to one or more external devices 20 through a network 6 operating as data feeding devices or systems which can feed data to the synchronized data management system 10. The data received from the external devices may be in one or more data formats depending on the data formats managed by the external devices 20.

A network 5 or 6 may include one or more private and/or public networks (e.g., the Internet) that enable the exchange of data such as the Internet, a local area network (LAN), a wide area network (WAN), a cellular voice/data network, one or more high speed bus connections, and/or other such types of communication network. The network 5 may use standard communications technologies and/or protocols such as 4G, Ethernet, 802.11, TCP/IP (Transmission Control Protocol/Internet Protocol, HTTP (Hypertext Transport Protocol), FTP (File Transfer Protocol), etc. Data can be exchanged over the network 5 according to different data exchange technologies and/or formats such as the hypertext markup language (HTML) and the extensible markup language (XML, JSON, etc.).

Each user device 4 may be a personal computing device, a tablet computer, a thin client terminal, a smartphone, and/or any other computing device that enables the user submit requests to the synchronized data management system device 10 over the network 5. Each user device 4 may host web browsers and/or custom applications software (e.g., a client system) and may include a client user interface 40 (such as a Graphical User Interface GUI).

At least a part of the user devices 4 may cooperate with each other through the synchronized data management system 10, using the network 5, to update data centrally managed by the synchronized data management system 10 while enabling a selected set of user devices 4 (reviewer devices) to review and validate the updates.

The synchronized data management system 10 may comprise a common storage 3 such as a database configured to store data, at least a part of such data being updatable by one or more users connected to the synchronized data management system 10 though a user device 4.

In embodiments in which the synchronized data management system 10 is connected to one or more external devices 20 acting as feeding devices, the data received from an external device 20 by the synchronized data management system 10 may be received in a given source data format. In such embodiments, the synchronized data management system 10 may use a data parser 102 to translate the format of the data received from such external devices into a predefined target data format. After translation, the synchronized data management system may store the data received from the external feeding device 20 in the common storage 3.

In some embodiments, the common storage 3 may comprise a master storage unit 30 (also referred to hereinafter as a 'master storage') configured to store data (for example data aggregated from multiple external feeding devices 20). The synchronized data system may further comprise an auxiliary storage unit 31 (also referred to hereinafter as an 'auxiliary storage') being configured to maintain updates of at least a part of the data stored in the master storage 30, forming draft updates, each update being associated with an identifier ID. In some embodiments, each update in the auxiliary storage may be further associated with one or more device identifiers identifying one or more User devices 4 from which a draft update has been received.

In one embodiment, the master storage 30 and the auxiliary storage 31 are both located in the same common storage 3. The following description of some embodiments will be made with reference to such embodiment wherein the common storage 3 includes the master storage 30 and the auxiliary storage 31, for illustration purpose.

Each user of a set of users, having predefined access rights to the synchronized data management system device 10, can submit a request to the synchronized data management system device 10 over the network 5, using a user device 4.

The synchronized data management system device 10 may comprise a server 101 for handling a request received from a user.

The graphical user interface (GUI) 40 of each user device 4 may be a rich client application or a web client application. Each user device 4 may further comprise a local storage 41 which may be for example a client side database or a file system.

In some embodiments, each user device 4 may also comprise a conflict resolution unit 42 configured to resolve conflicting data based on a set of rules, based on a master update and/or a user change.

A user of the set of users may have different access rights, depending on the application field of the invention. For example, if the user belongs to an organization, such as for example an airlines operations center, the user can have different access rights depending on the role(s) played by the user in the organization. Exemplary roles include in airlines operations center organization:

An Operations Controller: in such case, the user is responsible for managing the flight operations with regards to aircraft assignment.

A Slot Controller: In such case, a user is responsible for managing the slot assigned to a flight;

A Maintenance Planner: In such case, a user is responsible for managing the maintenance planning for aircrafts of the airlines.

A Crew planner: In such case, a user is responsible for managing the crew roster planning for flight of the airlines.

A Passenger Controller: In such case, a user is responsible for managing minimising the passenger impact due to flight disruption.

The access rights assigned to a given user include a 'read' right and/or an 'update' right on the different subsets of the data held in the master storage 30. However, in some embodiments, any change in one subset of the data may affect the data of another subset, thereby creating an interdependency.

To submit any request, a user equipped with a given user device 4 may previously connect and login to the synchronized data management system 10, for example by entering his/her credentials.

If access to the user is allowed, the user may be displayed a view on the Graphical user interface 40 enabling input of requests by the user (load, update).

A request sent by a user to the synchronized data management system 10 through network 5 may include for example:
A request for accessing a subset of data stored in the master storage 30 of common storage 3.
A request for accessing a draft solution stored in the auxiliary storage 31 of the common storage 3.
A request for making real-time updates on the already loaded data subset based on the updates stored in the master storage 30 and/or in the auxiliary storage 31.

In addition to requests related to data stored in the common storage 3, a user device 4 may further request to the server 101 real-time updates of the data stored in master storage 30, after a subset data load or the last update request.

In response to a new set of updates received by the user device 4, the conflict resolution unit 42, may resolve conflicts between the real-time master updates and local changes on a user device 4, if there are any. In response to the processing performed by the conflict resolution unit 42, the results may be rendered on the Graphical User Interface 40 of the user device 4.

A user using the Graphical User Interface 40 of the user device 4 can make changes to a subset of data (also called 'subset of master data') received from the master storage 30 of the synchronize data system 10 and can store such changes in a local storage 41, for later reference (the changes stored in the local storage 41 will be also referred to hereinafter as a 'draft solution').

A 'draft solution' saved on the local storage 41 of a given user device 4 may be shared by publishing the draft solution to the synchronized data management system 10 (the draft solution being thus an update to the subset of master data received from the master storage 30 and loaded on user device 4). In response to the publishing of the draft solution, the synchronized data management system 10 may store a part of the draft solution corresponding to the changes made by the user on the subset of master data and possibly additional information related to the data scope (also referred to as a 'data context') corresponding to contextual data identifying the master data of the subset of data which were used to create the draft solution in the auxiliary storage 31. The data stored in the common storage 3 corresponding to a draft solution published by a user to the auxiliary storage 31 will be referred to hereinafter as a 'draft update'. The synchronized data management system 10 may further assign a unique identifier to the draft update. Such unique identifier assigned to a draft update may include a description provided by the user along with a unique system generated Identifier (ID) and a user Identifier. It should be noted that the subset of master data is not stored with the draft solution in the auxiliary storage 31 as it is already stored in the master storage 30.

When a draft update is published to or stored in the auxiliary storage 31 of the common storage 3, the draft update can be accessed by other users using a user device 4, for example if another user handles a device that can be affected by changes included in the draft update.

In response to a request received from a user requesting a draft solution, the server 101 may retrieve the draft solution from the auxiliary storage 31 and send the draft solution to the user device 40 through which the user requested the draft solution.

If the user device 40 does not already include the subset of master data associated with the draft update, an additional request may be sent by the corresponding user device 4 to server 101 of the synchronized data management system 10 using the data scope included in the received draft solution. The master subset data and the draft solution may then be sent to the conflict resolution unit 42 for resolving possible conflicts in the data and loading the merged data in the Graphical User Interface 40 while highlighting the changes from the draft solution for review or changes. The user may review the draft update and depending on such review, the user may use the graphical User Interface 40 of the user device 4 to:

input additional changes to the draft update, which provides a modified version of the draft update, and then save the modified version of the draft update, such modified version of the draft update being then submitted to a set of reviewer user devices for review and validation by the users of such reviewer user devices; and/or input additional changes to the draft update, which provides a modified version of the draft update, and then publish the modified version of the draft update to the master storage 30; and/or send a request to the synchronized data management system 10 for publication of the draft update as is to the master storage 30 to notify validation of the changes included in the draft update if the user approves such changes; and/or notify partial or full rejection of the draft update if the user rejects at least a part of the changes corresponding to the draft update.

In response to a publication request for publishing a validated draft update to the master storage received by the synchronized data management system 10 from a user device 4, the server 101 of the synchronized data management system 10 may store the changes included in the validated draft update in the master storage 30 in a data format supported by the synchronized data management system 10.

In some embodiments, the synchronized data management system 10 may further send a message comprising data identifying the updates corresponding to the validated draft update (hereinafter referred to as "update data") to each external device 20 of a selected set of external devices in the data format handled by the external device 20 through the network 6. The message including the update data may be previously encoded using an encoding mechanism using a Data Encoder Unit 103 provided in the synchronized data management system 10 and sent to the external device 20 in an encoded form. The Data Encoder Unit 103 may be further configured to translate the updates corresponding to the validated draft update from the data format of the synchronized data management system 10 into the data format handled by the external device 20.

Alternatively, the synchronized data management system 10 may be configured to send a notification to the user device 4 which initially performed the draft update, each time the review of the update draft is completed by one of the reviewer devices 4.

In still another embodiment, the requesting device 4 may be configured to review some of the changes included in a modified version of the draft update corresponding to a review from a selected reviewer. The new draft update thus generated may be notified to the list of reviewer devices 4 according to the previous review process.

One or more components of the synchronized data management system 10, such as the data synchronized data management system 10, the external devices 20, and the user devices 4, may be implemented on one or more computing devices or systems, referred to collectively as a computer.

The data can be accordingly shared between or published between different user devices 4 and/or external devices 20 without corrupting the master data of the master storage unit 31 or publishing data to other systems.

Further, the embodiments of the invention enables review of the updates requested at a given user device 4 by one or more user equipped with respective reviewer devices, without a need to saving the updated data on the master storage unit 31 or publishing them directly to external systems.

Embodiments of the invention further obviate the need for creation of a complete copy of the master data comprised in the master storage 30, thereby limiting the computational costs of the centralized data management.

The synchronized data management system 10 may be used in various application fields to enable a set of authorized user devices synchronously update data. For example it may be used by a set of users in a same team or work group to enable such user to collaboratively make changes to a common document using their user devices, without a need to meet in a same room or have a call conference.

In another exemplary application of the invention, the synchronized data management system 10 may be used by an Airline Traffic Control system.

Figure 2:
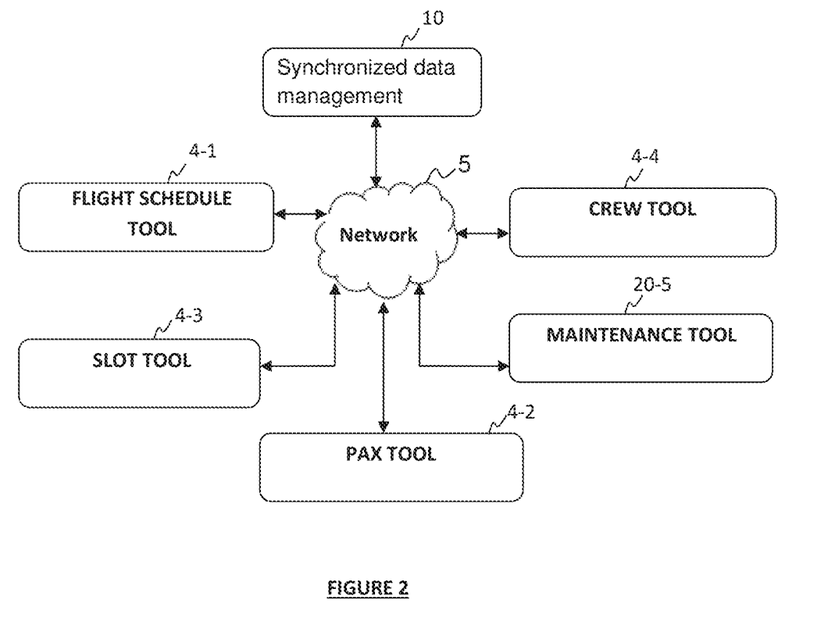
FIG. 2 is a diagrammatic view of the synchronized data management system, according to some embodiments.

FIG. 2 represents an exemplary operational environment of a synchronized data management system 10 according to an exemplary application of the invention to Airline Traffic Control.

The environment of FIG. 2 includes a plurality of user devices 4 connected to the synchronized data management system 10 through the network 5, each user of a user device 4 being assigned a specific schedule management role in connection to Airline Traffic control.

Each user device 4 may further exchange data with other external control systems such as an aviation resource management system, a passenger management system, etc.

Each user device 4 shown in FIG. 2 may forms a dedicated tool used by an airline control system, such tools being generally used to control "slots" which correspond to time windows in which aircrafts pass through a controlled air space.

In an exemplary application of the invention to Airline Control Systems, "slots" are issued by Authorities or Air Service Network Providers (ANSP's) on schedule and assignment basis (e.g. first scheduled, first assigned basis). While slots are assigned in a chronological order, disruptions can occur due to several factors, which requires optimal and dynamic reallocation of the assigned slots for the different aircrafts in a given controlled air space. Further, slot operators are not only required to exchange slots among flights in the Aircraft Operator flight schedule but also to exchange information with other operators of the same airline managing additional tools related the control of other parameters related to air traffic. Exemplary tools include for example a flight schedule tool configured to keep track of the state of the schedule of an airline. The data managed by such additional tools can be impacted by a slot change. More generally, although such data management tools are managed separately by each associated operator for safety and security reasons, the data managed by these tools are dependent from each other in the sense that any change occurring on the data managed by one tool can impact one or more other tools. Airlines thus employ multiple different operators to manage data related to airline schedules, including slot operators, schedule operators, maintenance operators, each using a separate management tool 4 to manage different airlines schedules (slot schedules, crew schedules, maintenance schedules, flight schedules) in order to timely and efficiently optimize such schedules in a coordinated way should a change occur in the data managed by one of the tools. For example, a slot operator may be provided with a slot tool generating a view of an airline schedule and a separate view of slot assignments. When a potential slot exchange is identified, in prior art approaches, a slot operator contacts a corresponding slot operator at another airline through a private network to request a slot exchange for a particular flight, and if an agreement is reached, the slot exchange may be executed. A slot coordinator can be also require to exchange data with one or more other schedule operators of the airline (crew operator, maintenance operator, etc.) to exchange data that may impact the data managed by such schedule operators.

More specifically, in the exemplary environment of FIG. 2, the user devices 4 include:

An airline Schedule Management Tool 4-1 (also referred to hereinafter as 'Airline Schedule Tool') which is configured to collect data from other external systems to keep track of the state of the schedule of an airline;

A PAX Management Tool 4-2 (also referred to hereinafter as 'Pax Tool') which is configured to aggregate passenger data related to each flight of the Airline, such as the number of passengers traveling in a specific class for a given flight;

A Slot Management Tool 4-3 (also referred to hereinafter as 'Slot Tool') which is configured to provide a slot assignment (such as for example landing or takeoff slot) for each flight; as used herein, a slot is defined at least by a beginning time, an end time, and an airport identifier;

A Crew Management Tool 4-4 (also referred to hereinafter as 'Crew Tool') which is configured to aggregate data related to the crew per flight, such that the number of persons assigned per crew category (e.g. pilot) per flight;

A Maintenance Management Tool 4-5 (also referred to hereinafter as 'Maintenance Tool') which is configured to provide maintenance data, which can include both schedule and unscheduled data for a given aircraft (such as for Example Auxiliary Power Unit (APU) checks).

It should be noted that the above list of scheduling management devices 4 is not limitative and that the synchronized data management system 10 may transparently connect to new tools such as for example a Baggage Management Tool for keeping track of passenger baggage processing per flight.

The schedule tool 4-1 may manage a number of aircrafts. The schedule tool 4-1 may determine different schedules for each managed aircraft by assigning each aircraft to the schedules. When an aircraft starts performing schedules, airline disruptions caused for example by weather conditions, aircraft breakdown or other events may occur, which can impact the initial scheduling. Accordingly, the disrupted schedule may impact another schedule or data managed by other tools 4. For example, a disruption may cause a flight delay which can impact the availability of the aircraft for the next slots, the passenger connections, the crew schedule, etc.

The Crew Management Tool 4-4 may comprise a Crew Planning function configured to determine the minimum legal requirements for crew resources crew per flight for any given schedules plan over a period taking into account various parameters such as national and/or company regulations, crew constraints (e.g. vacations, day off, training) and/or preferences. Crew resource requirements may be represented by base, fleet or by individual crew rank/function category.

The crew management tool 4-4 may further comprise a Crew Assignment function configured to generate crew assignment per flight taking into account various regulations such as international, and/or national, and/or company regulations, and/or individual crew requests and preferences.

The crew management tool 4-4 may also comprise a Crew Tracking function configured to track the crew resources of an airline and dynamically identify available crew resources if additional resources are needed in some situations.

The crew management tool 4-4 may also comprise Crew Records in the form of a database for crew administration, medical, training records and flight/duty time accumulators.

In such exemplary application of the invention to air traffic control, instead of requiring separate static exchanges between the operators of the scheduling devices 4 like in the prior art, each user device 4 may emit a request to the synchronized data management system 10, the request specifying at least: one or more user devices 4; a start and end period or date (minimum one day); auxiliary information such as carrier (or Airline) code, aircraft fleet type(s).

For example, a schedule operation controller can send request data to synchronized data management system 10 through the associated schedule tool 4-1, using a request specifying the following parameters: source device(s)=ALL; start date=11-JAN-2018; end date=13-JAN-2018; carriers=ALL.

In such application of the invention to Airline traffic control, a user managing a user device 4 (also referred to hereinafter as an 'operator' or 'operation controller' or 'ops controller' or 'stakeholder') designates the operator responsible for managing an aspect of airlines operation.

In some embodiments, different rights may be assigned to each operator controller managing one of the external devices 20. For example:

The operation controller managing the airline Schedule Management Tool 4-1 may be assigned rights to edit (i.e. read/write) data from the common storage 3 related to flight timings, status, aircraft assignment, etc;

The operation controller managing the Slot Management Tool 4-3 may be assigned rights to edit (i.e. read/write) slot assignment for flight;

The operation controller managing the Maintenance Tool 4-5 may be assigned rights to perform maintenance planning on Aircraft, and to validate (approve) schedule changes proposed by one or more other operation controllers managing other external device 20.

The operation controller managing the Crew Management Tool 4-4 may be assigned rights to validate schedule changes proposed by other operation controllers based on crew assignment feasibility in an external aviation resource management system configured to control airline costs such as the ARMS system (ARMS is a registered trademark of Sheorey Digital Systems Pvt. Ltd).

Figure 3:
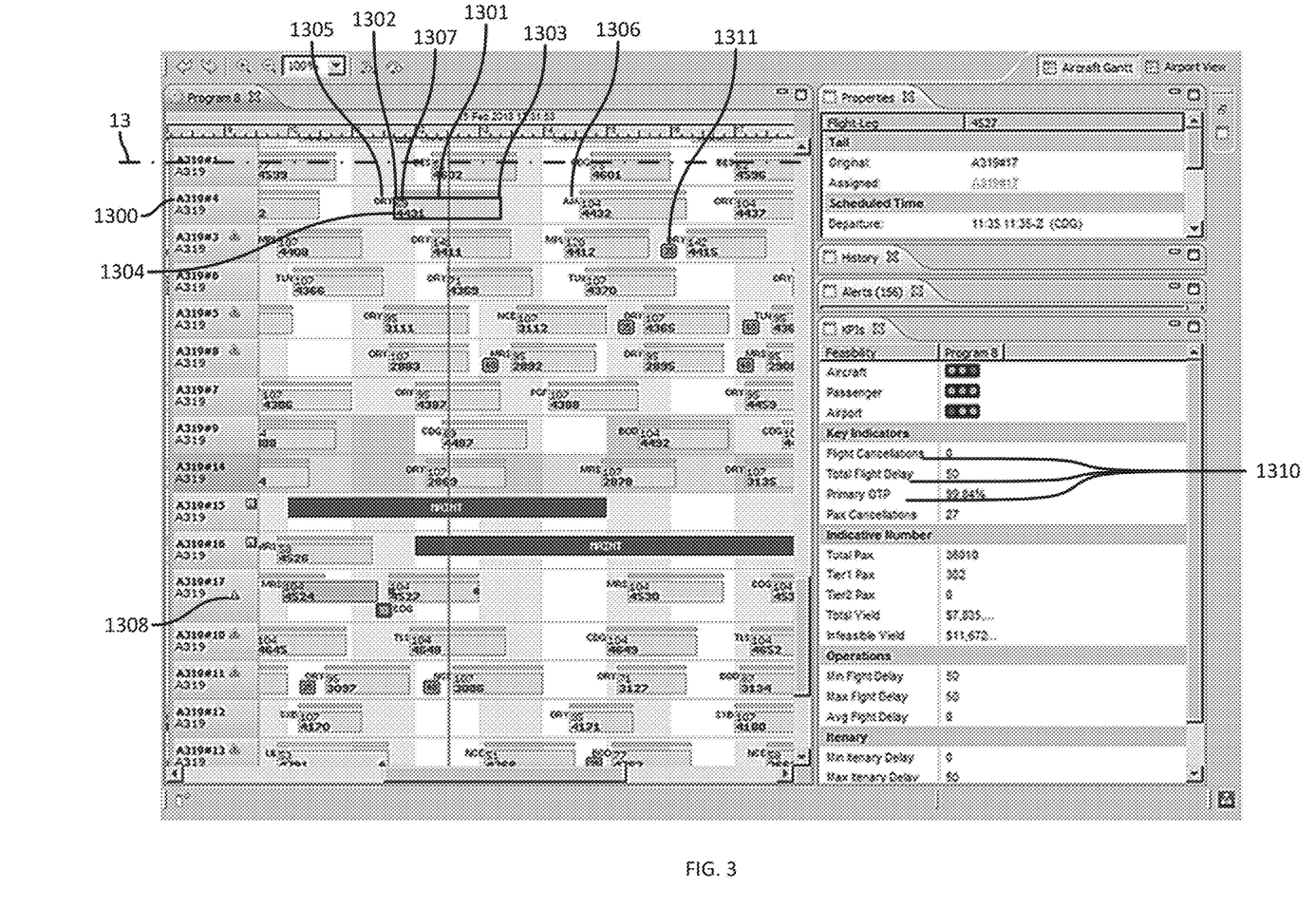
FIG. 3 illustrates a graphical display of an air traffic control system, according to an exemplary embodiment.

FIG. 3 illustrates a graphical display of an exemplary application to the synchronized data management system 10 for air traffic control. The graphical view shown in FIG. 3 is a Gantt view displayed on the user interface 40. The Gantt view may be accessed simultaneously by one or more operators through the use of their respective user devices 4.

Each operation controller managing a user device 4 may connect to the user device 4 (for example slot tool). The graphical interface of the external device 4 is then displayed to the user. The user may access to an interface representing a Gantt view for controlling schedule data. The Gantt view displayed to each user device 4 can comprise data which are common to all user devices 4 and additional data specific to the user device role. In response to an update from the operation controller on the view, the view is auto-synchronized. Further, in response to the validation of an update by the synchronized data management system 10, the update being requested in another user device 4 managed by another operation controller, the Gantt View of the graphical interface of each user device 4 of the system 10 is simultaneously updated to reflect the changes.

As shown in FIG. 3, the display (Gantt view) may comprise a plurality of horizontal time line axis 13, each horizontal line corresponding to a timeline schedule for a given aircraft.

Each line 13 comprises an identification 1300 of the associated aircraft (for example Aircraft A319#17), at the beginning of the line, and a set of rectangular boxes 1301 corresponding to time slots. Each box 1301 is delimited by a left edge corresponding to a flight departure (1302) and a right edge corresponding to a flight arrival (1303), and is positioned at a position with respect to the timeline that is consistent with the flight departure. Each time slot 1301 further comprises a flight number 1304 representing the number of the flight (e.g. '4431'). Each time slot 1301 is also associated at the left with an indication 1305 representing the departure location and at the right with an indication 1306 representing an arrival location, in IATA format.

Each line 13 further comprises in association with each time slot box, an indication 1307 of the number of passengers for the corresponding flight. Error flags 1308 may be further displayed in each line 13 to indicate errors related to the schedule, for example if the connecting time is too short.

For example, line 13 corresponds to Aircraft A319#17 (reference 1300) and include a time slot 1301 corresponding to flight number 4527 (reference 1304), a number of passengers equal to 104 (reference 1307), a start time scheduled for '11:25' (reference 1303) and an end time scheduled for '1 pm' (reference 1304), a start location 'CDG' (reference 1305), an end location 'MRS' (reference 1306). An error flag (1308) is displayed indicating that the connecting time is to too short (turnaround violation).

When the operation controller selects an object in the display (Gantt view) using the user device 4, such as for example a flight, this may trigger a display of the properties of the flight in the right end corner (property box).

The display may further comprise, at the bottom right, key performances indicators 1310 such as total flight delay, On Time Performance OTP, etc. Further, the display may comprise an indication 1311 of the number of the passengers having a connection.

Each operation controller can customize the view based on his or her needs.

The synchronized data management system 10, according to the embodiments of the inventions may be implemented in an Airline Operation Center to enable the various operation controllers to collaboratively, securely, timely and seamlessly perform operations on the data set maintained in the common storage 3 (such as control, access, updates operations) while taking into account the management rights of each operation controller with respect to the data. This ensures that a decision made by one operation controller on the data which could affect other user devices 4 in a certain extent (with minor or drastic impact for example) can be applied in accordance with the management rights of each operation controller, with a suitable process review in case of updates.

In such application, it is an advantage of the invention to ensure that the data stored in the synchronized data management system 10 can be seamlessly and collaboratively updated by a set of users, without any update conflict. For example, if due to a mechanical problem, a given aircraft is out of service, two operation controllers may need to anticipate and contemplate various solutions/scenarios (exploration solutions), such as for example by performing drag and drop operation from an aircraft to another in the Gantt view. However, they may wish to avoid that the updates be performed on the real time data maintained in the master storage unit 30 as finally the envisioned solutions may not be needed, for example if the aircraft can be repaired.

The following description of some embodiments of the invention will be made mainly with reference to the exemplary application of the invention to airline traffic control systems, for illustration purpose only, although the skilled person will readily understand that the invention may be implemented in various applications to enable a set of users collaboratively make change to common data.

Figure 4:
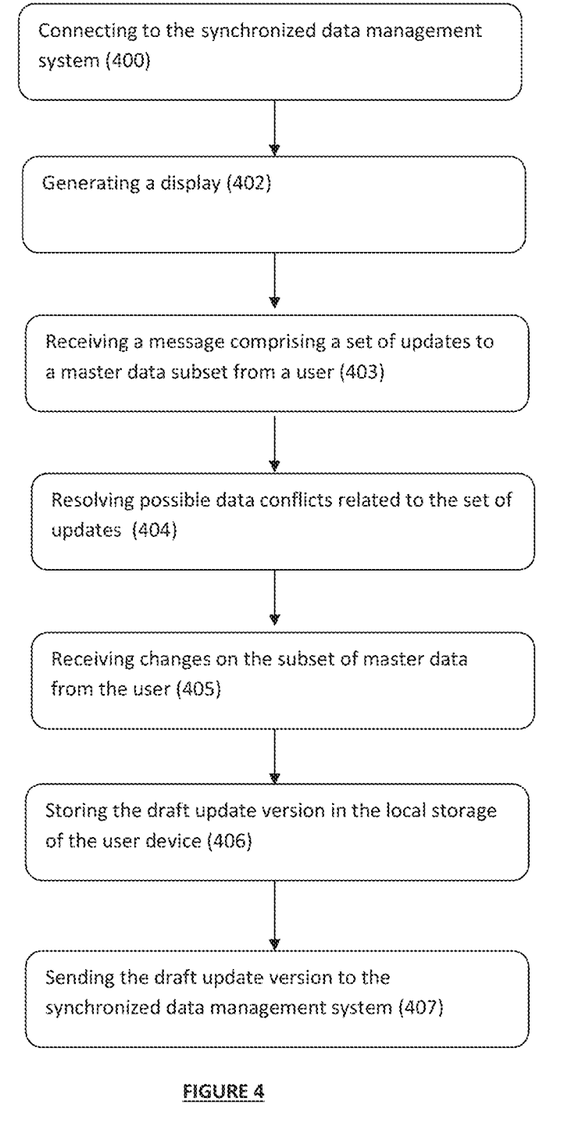
FIG. 4 is a flowchart illustrating a method of updating data in the synchronized data management system, in accordance with an embodiment of the invention.

FIG. 4 is a flowchart representing the process of managing a local storage 41 at a user device 4.

In step 400, a user equipped with a given user device 4 may connect and login to the synchronized data management system 10 using an authentication process.

If access to the user is allowed, in step 402, a display in the Graphical user interface 40 may be generated.

In step 403, a message (also called synchronization request) may be received by the user from the synchronized data management system 10, the message comprising new set of updates corresponding to a subset of master data stored in the master storage 30.

In step 404, in response to the receipt of the new set of updates received from the synchronized data management system 10, conflicts between the received real-time master updates and local changes on the user device are resolved, if data conflicts are detected.

In step 405, the user managing the user device 4 which received the new updates may make a set of changes to the subset of data (also called 'subset of master data') received from the master storage 30 of the synchronize data system 10.

In step 406, such changes made by the user may be stored in a local storage 41 of the user device 4, for later reference, such changes forming 'draft solution' (also referred to as a "draft update version").

In step 407, the draft update version stored in the local storage 41 of the user device 4 may be shared by publishing (or more generally sending) the draft update version (corresponding to an update of the subset of master data received from the master storage 30 and loaded in the local storage 41) to the synchronized data management system 10.

Figure 5:
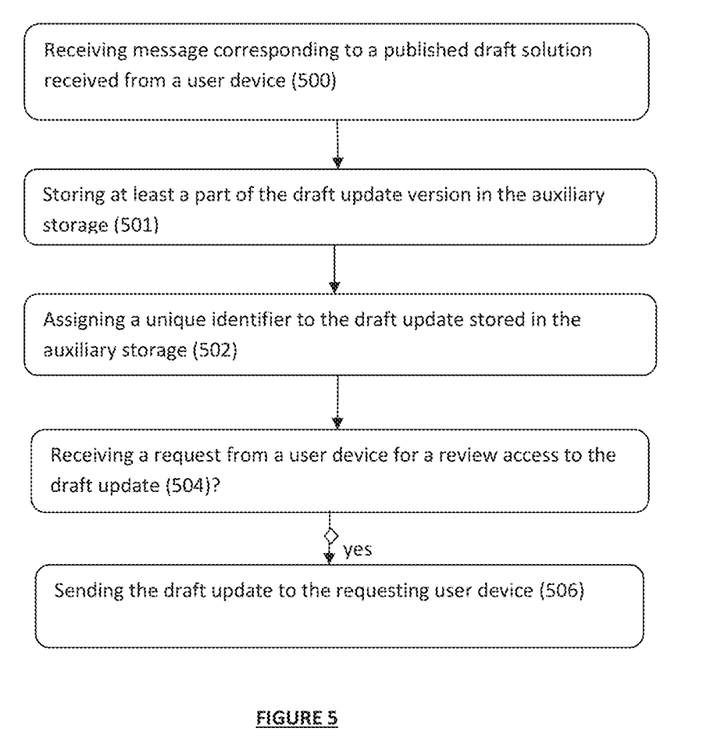
FIG. 5 is a flowchart illustrating a method of reviewing data updates, in accordance with an embodiment of the invention.

FIG. 5 is a flowchart representing the process of a processing a message corresponding to a published draft solution received from a user device 4 by the synchronized data management system 10.

In step 501, in response to the receipt of a message corresponding to a published draft update version received from a user device 4 in block 500 (corresponding to step 407 of FIG. 4), at least a part of the draft solution corresponding to the changes made by the user on the subset of master data is stored in the auxiliary storage 31. In step 501, additional information related to the data context (contextual data identifying the master data of the subset of data which were used to create the draft solution) may be additionally stored in the auxiliary storage 31 in association with the draft solution. The data thus stored in the auxiliary storage thus form a 'draft update'.

In step 502, a unique identifier may be assigned to the draft update in the auxiliary storage 31. The unique identifier may be generated from a unique system generated Identifier (ID) and a user Identifier.

The draft update thus stored in the auxiliary storage 31 of the common storage 3 may be then accessed by a set of selected users such as users handling a user device 4 that can be affected by changes included in the draft update. The draft update thus corresponds to a set of updates made by at least one user to the master data subset.

In response to a request received from a user requesting a draft update from the auxiliary storage for review of the draft update (block 503), if the user is authenticated as belonging to a set of selected reviewer users, the draft update is retrieved from the auxiliary storage 31 in step 504.

In step 506, the draft update is sent to the requesting user device 4. Alternatively, step 504 and 506 may be replaced by a step of automatically sending the draft update to a predefined set of selected reviewer users for review by such users.

Figure 6:
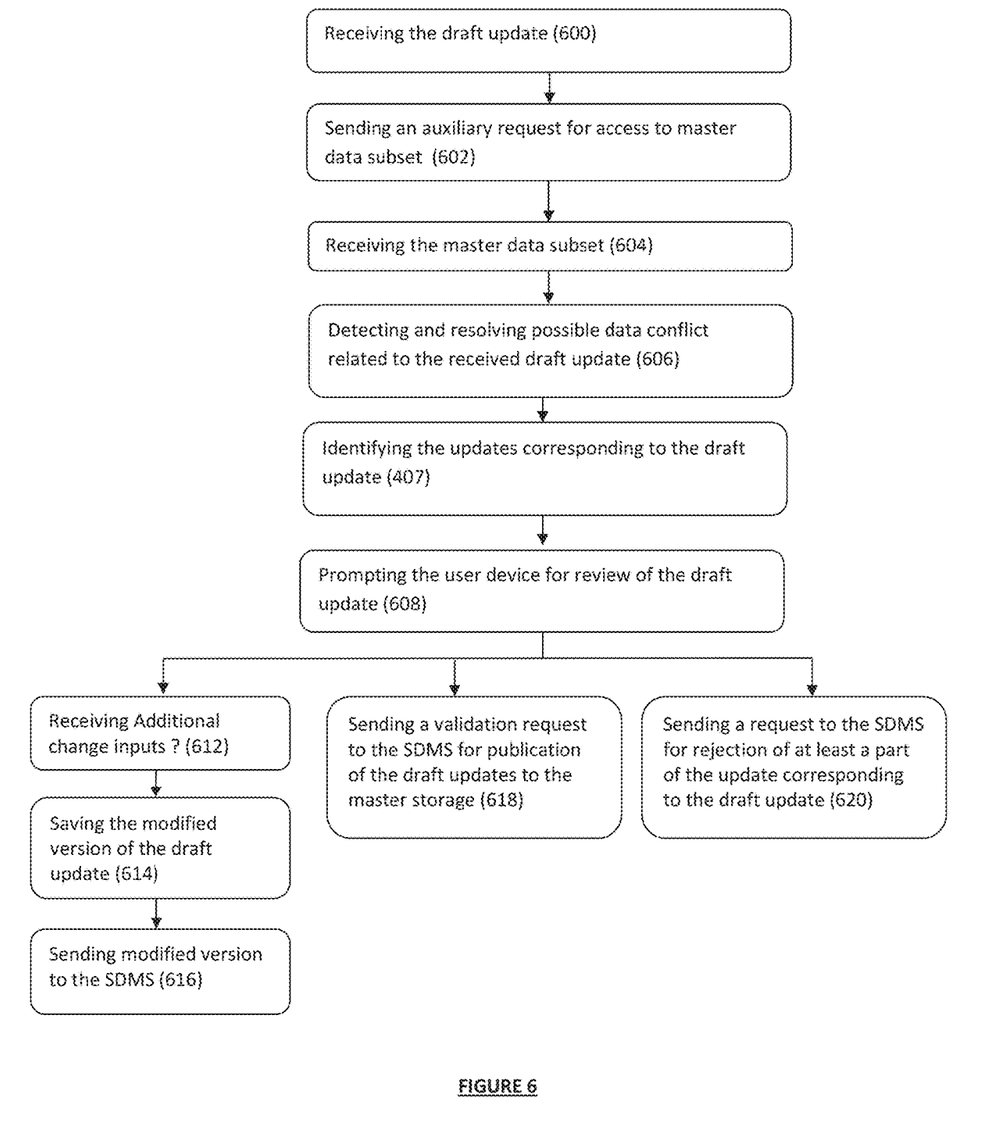
FIG. 6 is a diagrammatic view of an exemplary computing system for hosting a component of the environment of FIG. 1.

FIG. 6 is a flowchart representing the process of reviewing a draft update by a requesting user using a user device 4 (the requesting user is also called 'reviewer device' hereinafter), in response to the receipt of a draft update from the auxiliary storage 31.

In step 600, the draft update is received by the requesting device 4.

If the user device 4 does not already include the subset of master data associated with the draft update, in step 602, an auxiliary request may be sent to the synchronized data management system 10, the additional request identifying the data context included in the received draft solution.

In step 604, in response to the auxiliary request, a master data subset corresponding to the data context may be received by the reviewer user device.

In step 606, conflict resolution may be performed on the received data (master subset data and draft update) to detect and resolve possible conflicts in the updated data.

In step 608, the updates corresponding to changes made in the master data subset (which are to be reviewed by the reviewer user) may be identified at the reviewer user device from the draft update. The changes may be then highlighted in the graphical user interface of the user device 4 to enable easy and quick identification of the changes by the reviewer user.

In step 610, the user may be prompted for review of the draft update, using the graphical User Interface 40 of the user device 4 used by the reviewer device.

In step 612, if the user inputs additional changes to the draft update (modified version of the draft update), the modified version of the draft update is saved and in step 614, the modified version of the draft update is submitted to a set of reviewer user devices for review and validation by such users.

In step 616, if the user inputs additional changes to the draft update (modified version of the draft update), the modified version of the draft update is published (or sent) to the master storage 30 (step 617).

In step 618, the user can alternatively send a request ('validation' request) to the synchronized data management system 10 for publication of the draft update to the master storage 30. This can correspond to a notification of a validation of the changes included in the draft update whereby the user approves the changes.

Otherwise, in step 620, the user may send a reject notification to the synchronized data management system 10 to notify partial or full rejection of the draft update whereby the user rejects at least a part of the changes corresponding to the draft update.

In response to receiving a validation request (step 618 of FIG. 6), the update method implemented in the synchronized data management system 10 may comprise a step of storing information related to the validation message received from the user device of the reviewer user and waiting for the feedbacks of the remaining reviewer devices. In one embodiment, the draft update may be stored in the master storage 30, if all the feedbacks received from the reviewer devices of the selected set of reviewer devices comprise a validation request. In some embodiments, feedbacks from the reviewer devices may be awaited for a predefined period of time and only the feedbacks received during the predefined period of time may be taken into account. In some embodiments, a notification may be sent to the initiating user device 4 which initially performed the draft update, each time the review of the update draft is completed by one of the set of selected reviewer devices 4.

In response to receiving a rejection notification related to at least a part of the updates comprised in the draft update (step 620 of FIG. 6), the update method implemented in the synchronized data management system 10 may reject the part of the updates identified by the rejection notification. Accordingly, the rejected part of the updates will not be stored in the master storage.

Figure 7:
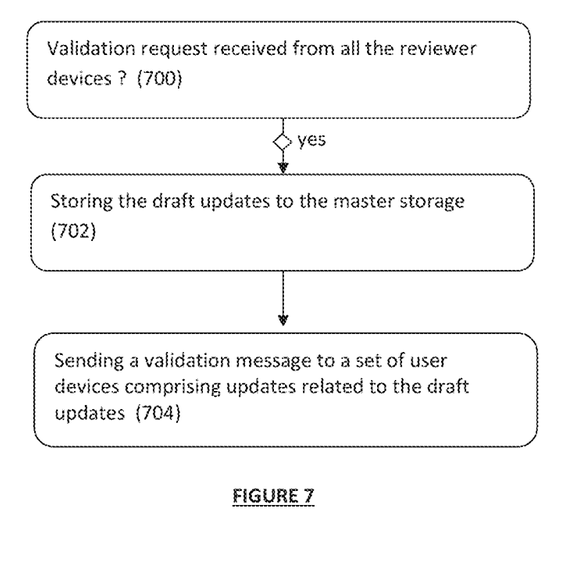
FIG. 7 is a flowchart illustrating a method of publishing validated updates.

FIG. 7 is a flowchart representing the process of publishing a validated draft update to the master storage 30 in response to validation requests received from all the reviewer users of the set of reviewer devices by the synchronized data management system 10.

In step 700, it is determined if validation requests for publishing a validated draft update to the master storage have been received from all reviewer users of the set of reviewer devices.

If so, in step 702, the changes included in the validated draft update are stored in the master storage 30 in a data format supported by the synchronized data management system 10.

In step 704, a message comprising data identifying the updates corresponding to the validated draft update (hereinafter referred to as "update data") may be further sent to each user device 4 among a selected set of user devices through the network 5. The message including the update data may be encoded using an encoding mechanism and sent to the user devices 4 of the set of select user devices in an encoded form.

Figure 8:
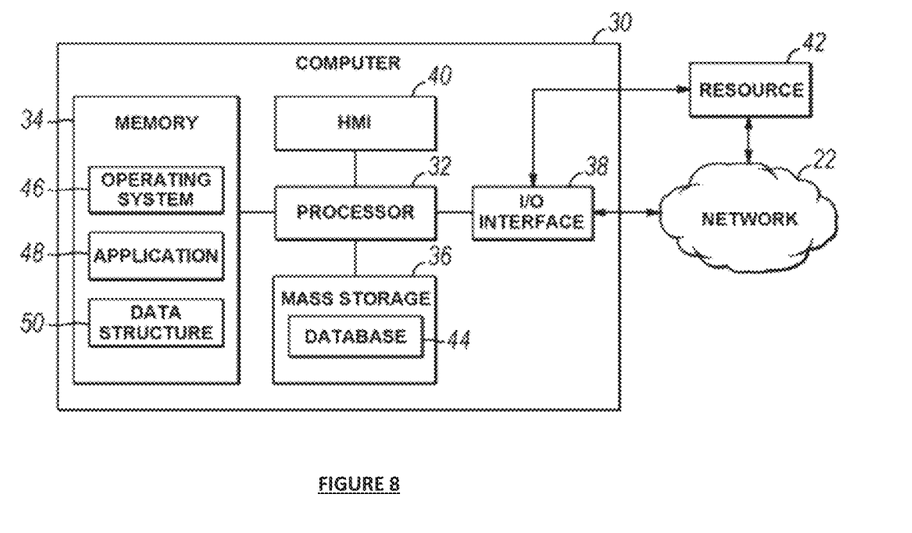
FIG. 8 is a block diagram of a computer implementing components of the system of FIG. 1.

FIG. 8 is a block diagram schematically illustrating a computer 60 which may be used to implement components of the data management system 10 and/or the user devices 4, according to some embodiments.

Computer 60 may comprise, for example, one or more devices selected from a desktop computer, a laptop computer, a workstation, a tablet computer, a smartphone, a handheld computer, an enterprise class server, or any other such computing device. A combination of different devices may be used in certain embodiments.

Computer 60 may include a processor 32, a memory 34, a mass storage memory device 36, an input/output (I/O) interface 38, and a Human Machine Interface (HMI) 39. The computer 60 may also be operatively coupled to one or more external resources 42 via the network 6 (which may be network 21 for example) and/or I/O interface 38. External resources may include, but are not limited to, servers, databases, mass storage devices, peripheral devices, cloud-based network services, or any other suitable computing resource that may used by the computer 60.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 44 may reside on the mass storage memory device 36, and may be used to collect and organize data used by the various systems and modules described herein.

Processor 32 may operate under the control of an operating system 46 that resides in memory 34. The operating system 46 may manage computing resources so that computer program code embodied as one or more computer software applications, such as an application 48 residing in memory 34 may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, and/or application 48 to store or manipulate data.

The I/O interface 38 may provide a machine interface that operatively couples the processor 32 to other devices and systems, such as the network 6 and/or external resource 42. The application 48 may thereby work cooperatively with the network 6 and/or external resource 42 by communicating via the I/O interface 38 to provide the various features, functions, applications, processes, and/or modules comprising embodiments of the invention. The application 48 may also have program code that is executed by one or more external resources 42, or otherwise rely on functions and/or signals provided by other system or network components external to the computer 60. Indeed, given the nearly endless hardware and software configurations possible, persons having ordinary skill in the art will understand that embodiments of the invention may include applications that are located externally to the computer 60, distributed among multiple computers or other external resources 42, or provided by computing resources (hardware and software) that are provided as a service over the network 6, such as a cloud computing service.

The HMI 39 (such as HMI 40 in the implementation of FIG. 1 of a user device 4) may be operatively coupled to the processor 32 of computer 60 in a known manner to allow a user of the computer 60 to interact directly with the computer 60. The HMI 39 may include video and/or alphanumeric displays, a touch screen, a speaker, and any other suitable audio and visual indicators capable of providing information to the user. The HMI 39 may also include input devices and controls such as an alphanumeric keyboard, a pointing device, keypads, pushbuttons, control knobs, microphones, etc., capable of accepting commands or input from the user and transmitting the entered input to the processor 32.

The database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, an object-oriented database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules. Although embodiments of the invention may be described herein using relational, hierarchical, network, object-oriented, or other database terminology in specific instances, persons having ordinary skill in the art will understand that embodiments of the invention may use any suitable database management model, and are not limited to any particular type of database.

While the invention has particular advantages in the field of airline control tower systems, it should be noted that the invention also applies to management of data accessible by multiple external devices, in a quasi real time environment, where each external device manages a type of data schedule, the data schedule managed by a given external device being impacted by the data managed by one or more other external device.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. While the embodiments of FIGS. 4 to 7 have been described according to a particular processing order, the skilled person will readily understand that the invention is not limited to such sequence of steps and that some steps can be implemented in a different order. More generally, in certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The invention claimed is:

1. A synchronized data management system for managing data, the system being connected to a plurality of user devices through a network, the system comprising:
    a common storage database comprising a master storage unit configured to store data;
    an auxiliary storage unit, distinct from the master storage unit and from the given user device, configured to store updated data; and
    a server configured to:
        receive an update request from a given one of the user devices;
        in response to the update request, retrieve a subset of data stored in the master storage unit, and send the subset of data to the given user device;
        receive, from the given user device, an update made to the subset of data;
        store the update in the auxiliary storage unit, for validation prior to storage in the master storage unit;
        receive one or more validation requests from a set of at least one reviewer device selected from the user devices; and
        publish the update made to the subset of data from the auxiliary storage unit to the master storage unit in response to receiving the one or more validation requests.

2. The synchronized data management system of claim 1, wherein the synchronized data management system is configured to send a message including an update stored in the auxiliary storage unit to each of the reviewer devices.

3. The synchronized data management system of claim 1, further comprising a data encoder unit configured to;
    encode the update using at least one encoding mechanism; and
    send a message including the encoded update to each of the reviewer devices.

4. The data management system of claim 3, wherein the data encoder unit is configured to encode the update in a data format handled by the reviewer device.

5. The data management system of claim 1, wherein the auxiliary storage unit is located in the common storage database.

6. The data management system of claim 1, wherein the update made to the subset of data is associated with a unique identifier, the unique identifier being stored in the auxiliary storage unit.

7. The data management system of claim 1, wherein the server is further configured, prior to receiving the one or more validation requests, to send the subset of data of the master storage unit associated with the update to each of the reviewer devices.

8. The data management system of claim 1, wherein the server is configured to receive a modified version of the update made to the subset of data from a user device of the set of selected user devices and store the modified version of the update to the auxiliary storage unit.

9. The data management system of claim 2, wherein the server comprises a conflict resolution unit configured to detect and resolve a data conflict between the update made to the subset of data in the auxiliary storage unit and the master data of the master storage unit, the conflict resolution unit being further configured to merge the update made to the subset of data in the auxiliary storage unit with the master data of the master storage unit in response to conflict resolution, prior to integration of the merged data in the master storage unit.

10. A synchronized data management method for managing data in a computerized system connected to a plurality of user devices through a network, the method comprising:
    receiving, at a server, an update request from a given one of the user devices;
    in response to the update request, retrieving, by the server, a subset of data stored in a master storage unit of the system, and sending the subset of data to the given user device;
    receiving at the server, from the given user device, an update made to the subset of data;
    storing the update in an auxiliary storage unit distinct from the master storage unit and from the given user device, for validation prior to storage in the master storage unit;
    receiving, at the server, one or more validation requests from a set of at least one reviewer device selected from the user devices, and
    publishing, by the server, the update made to the subset of data being from the auxiliary storage unit to the master storage unit in response to receiving the one or more validation requests.

* * * * *